United States Patent [19]

Hensy et al.

[11] 4,016,577
[45] Apr. 5, 1977

[54] PHOTOPRINTING AND PROCESSING DEVICE

[75] Inventors: Philip E. Hensy, Plantation; Morey R. Zuber, Fort Lauderdale, both of Fla.

[73] Assignee: Visual Graphics Corporation, Tamarack, Fla.

[22] Filed: July 7, 1975

[21] Appl. No.: 593,879

[52] U.S. Cl. .................. 354/78; 354/307; 355/72

[51] Int. Cl.² .................. G03B 29/00; G03B 27/58

[58] Field of Search .......... 354/78, 77, 308, 309, 354/310; 355/72, 73, 74, 27, 28

[56] References Cited

UNITED STATES PATENTS

| 929,809 | 8/1909 | Willyerd | 354/78 X |
|---|---|---|---|
| 1,745,900 | 2/1930 | Lower | 355/74 |
| 3,167,996 | 2/1965 | Adler | 355/28 |
| 3,208,335 | 10/1965 | Doherty | 355/27 |
| 3,240,115 | 3/1966 | Robbins et al. | 354/78 X |
| 3,283,647 | 11/1966 | Fairbanks et al. | 355/28 |
| 3,354,804 | 11/1967 | Jones | 355/27 X |
| 3,437,409 | 4/1969 | Friedel | 354/126 X |
| 3,615,133 | 10/1971 | Fairbanks et al. | 355/27 |
| 3,632,204 | 1/1972 | Friedel | 355/27 |

Primary Examiner—Edna M. O'Connor
Attorney, Agent, or Firm—Albert F. Kronman

[57] ABSTRACT

A photographic copying device capable of storing, exposing and processing both color and black and white photosensitive material including an exposing chamber which can be made light tight for handling color sensitive material or safelight protected for black and white material. Positioning stops in the exposing chamber make it possible to orient photosensitive material in complete darkness. The copying device can be operated in ambient light through light baffles. The material being photographed may be transparent, opaque or in the form of slides. A slide projector section directs light from the slides into the exposing chamber. A central control panel governs all copying operations.

9 Claims, 14 Drawing Figures

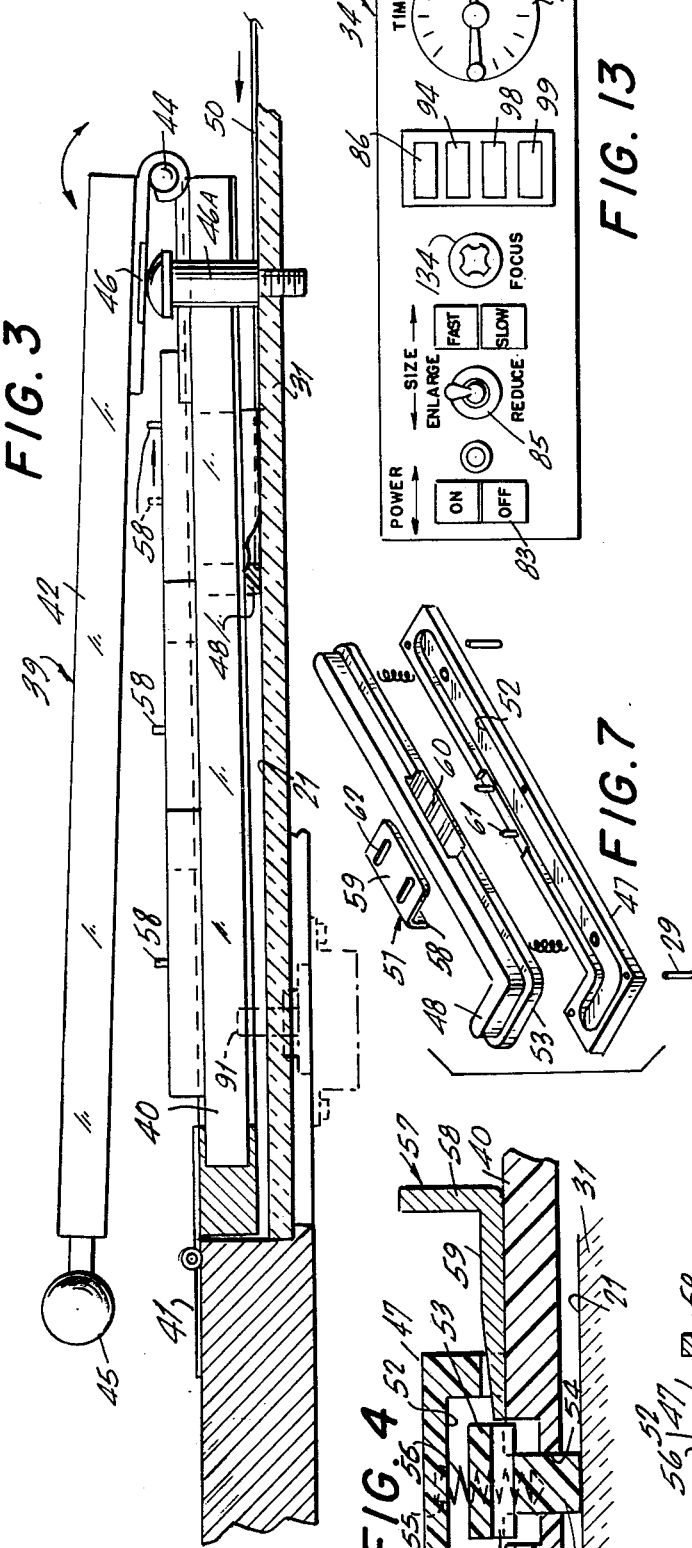

PHOTOPRINTING AND PROCESSING DEVICE

BACKGROUND OF THE INVENTION

This invention is an improvement upon U.S. Pat. No. 3,437,409 issued Apr. 8, 1969 to Murray Friedel. The referenced patent disclosed a photoprinting and processing device suitable for the exposure and developing of black and white photosensitive material. The photosensitive material was handled within a chamber which could be viewed by the operator through a safe-light window. Selection, positioning and exposing of the photosensitive material was thus possible even though the operator was in an illuminated room. Such apparatus, however, could not be used for color.

The present invention makes it possible to use photosensitive material which can produce full color copies within a copying device without the need for a dark room.

Another object of the present invention is to provide a copying device which can produce either black and white or full color copies as desired without machine modification or extensive set up delays.

A further object of the present invention is to provide a highly versatile copying device for a wide variety to copy sizes.

An object of the present invention is to provide a high speed color copier.

A feature of the present invention is its exposing table and its adjustable photosensitive material positioning stops which can be operated without visual reference.

Another feature of the present invention is its apparatus for using translucent slides within a projector as the source of material to be copied.

A further feature of the invention is the provision of both color processing and black and white processing stations.

Still another feature of the invention is its central control station from which the operator can carry out all copying operations.

SUMMARY

The photoprinting and copying device according to the present invention includes a copy carrying section, an exposing section and a processing section for the exposed photosensitive material.

The copy carrying section is provided with an upstanding copy board upon which opaque or translucent copy may be secured for viewing by the camera lens of the exposing section. Alternately, a slide projector may be placed in the copy-carrying section with its projection lens directed into the camera.

The exposing section is enclosed within a light tight housing having hand holes at one end thereof for the operator to reach the interior of the housing. Light baffles prevent light leaks through the hand holes at all times. A table having selectively positioned stops is disposed within the housing so that photosensitive material may be accurately placed in the housing for exposure.

A color processing section consisting of a plurality of tanks containing developing chemicals is in communication with the housing interior to receive the exposed photosensitive material. A black and white processing section is also available.

DESCRIPTION OF THE DRAWINGS

In the accompanying drawings, forming a part hereof, similar reference characters designate corresponding parts, and in which:

FIG. 3 is a view in side elevation of the platen of FIG. 2.

FIG. 4 is a cross sectional detail view taken on line 4—4 of FIG. 2.

FIG. 5 is a cross sectional detail view taken on line 5—5 of FIG. 2.

FIG. 6 is a cross sectional detail view taken on line 6—6 of FIG. 2.

FIG. 7 is a somewhat exploded view of the stop assembly for the photosensitive material shown in an upside down position for the sake of clarity.

FIG. 8 is a detail view in vertical cross section of a sensing portion of the apparatus.

FIG. 13 is a plan view of the control panel shown in FIG. 1.

GENERAL DESCRIPTION

Figure 1:
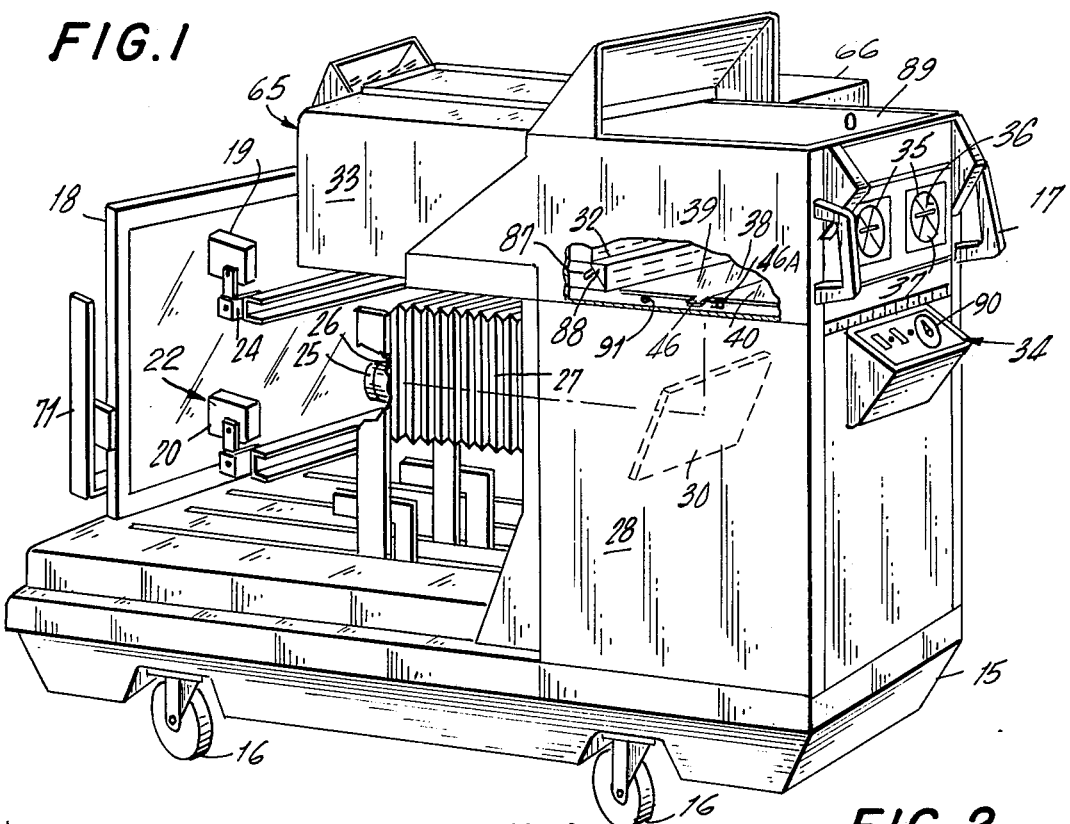
FIG. 1, is a perspective view partly broken away of a complete embodiment of the invention.

Referring to the drawings and particularly to FIG. 1, the entire printing and copying mechanism is mounted on a base 15 which is equipped with wheels 16 for moving from one location to another. A pair of handles 17 enable an operator to control the movement of the machine. At one end of the base, a copy board 18 is secured.

A source of light 22 consisting of spaced lamps is adjustably secured to the base 15 by means of bracket 24. The copying lens 25 is mounted on a vertical board 26 and a collapsible bellows 27 is connected between the lens board and main machine housing 28.

The main housing 28 includes a mirror 30 (shown in dashed lines), and a transparent table 31 for holding a sheet or plate of light sensitive material in the lens image plane. A storage compartment 32 for holding a supply of sensitized sheets, and a complete developing, fixing tank and drying means 33 is carried within the housing 28.

An electrical control panel 34 is mounted at the end of the machine opposite the copy board 18. The control panel 34 contains switches for turning on the copying and printing mechanism, the lamps 19, 20, and other electrical controls which will be described hereinafter.

Above the control panel 34 two hand holes 35 and 36 are positioned for an operator to manipulate the photosensitive sheets. The construction of the hand holes is fully set forth in U.S. Pat. No. 3,437,409 and need not be repeated here. The hand holes are provided with a plurality of overlapping flexible panels 37 which prevent light from entering the housing 28 at all times.

Immediately adjacent the hand holes 35, 36 within the camera housing 28 is an exposure chamber 38. The exposure chamber 38 is in communication with the storage compartment 32 for the photosensitive material, which may be in the form of coated sheets of plastic material or glass as is well-known in the photographic art. The bottom of the exposure chamber 38 includes a window (not shown) within which there is secured a transparent table 31 through which light entering the camera lens 25 and reflected by the mirror 30 is transmitted.

Figure 2:
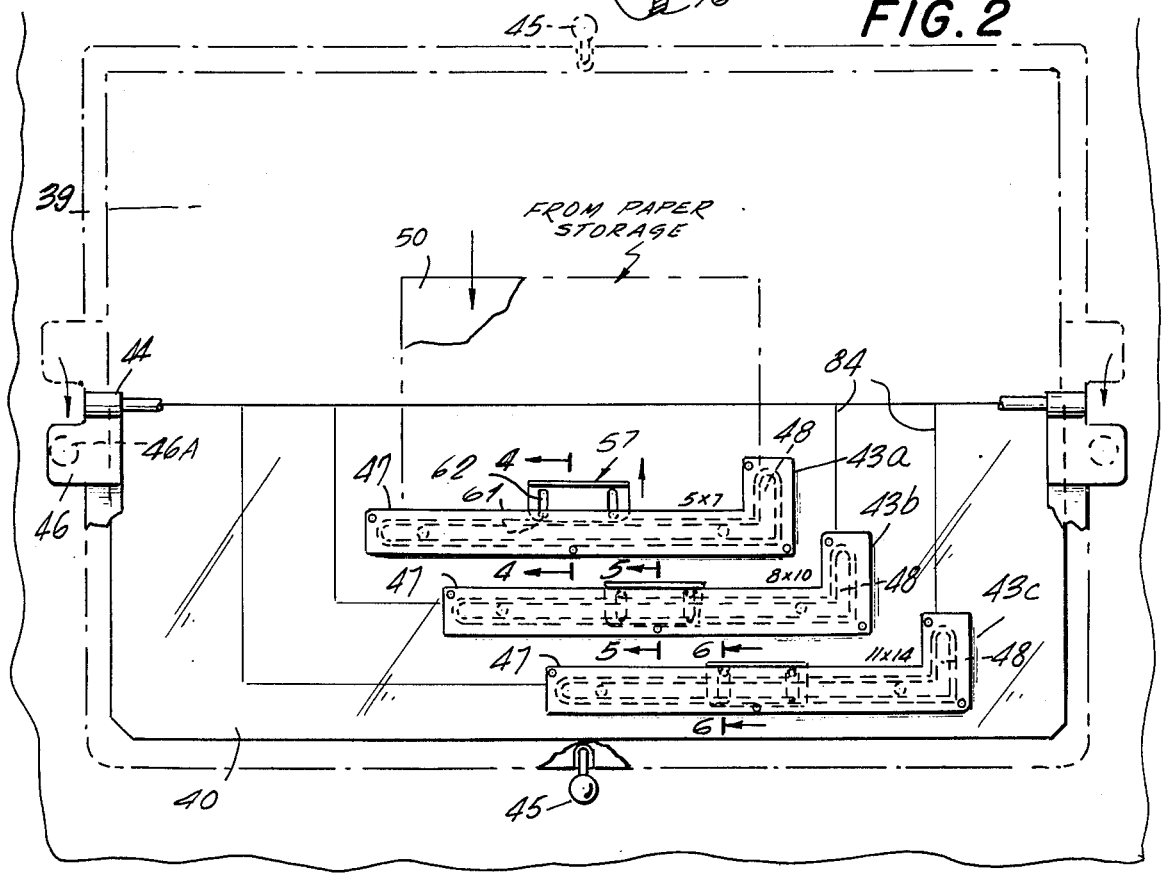
FIG. 2 is a plan view on an enlarged scale of the platen for the photosensitive material in FIG. 1.

The transparent table 31 forms the bottom of a hinged platen 39 more fully illustrated in FIGS. 2 and 3. The platen 39 includes a pressure plate 40 secured by the hinge 41 along one margin to housing 28. A second portion of the pressure plate 42 is connected by a hinge 44 to the first portion 40. The first portion of the pressure plate 40 is adapted to receive thereunder a sheet of the photosensitive material for exposure purposes. The plate 40 is also provided with a series of stops 43 for orienting the photosensitive material within the exposure chamber 38. The stops 43 best illustrated in FIGS. 4 through 7, hereinafter, will be more fully described.

The pressure plate 42 may be swung from a position overlying the photosensitive material to that shown in FIG. 3 by means of handle 45. It will be seen from an examination of FIG. 3 that as the second portion of the pressure plate 42 is brought back to overlie the first portion 40 a small tab 46 carried on the plate 42 will come to bear upon a stop 46a secured to the housing 20. The height of the stop 46a is such that it will raise the first portion of the pressure plate 40 slightly above the surface of the transparent table 31 so that photosensitive material can be slipped thereunder.

It will be apparent that where photosensitive material capable of producing color images is employed no light can be permitted to enter the exposure chamber 38. As a result, the operator is required to remove photosensitive material from the storage compartment 32, orient it upon the table 31 so that it precisely overlies the area of the projected image, operate the exposure mechanism and, thereafter, feed the exposed photosensitive material into the processor. Of all these operations, the most difficult is the step of orienting the photosensitive material upon the table 31. This problem becomes more difficult when photosensitive material of various sizes are employed without interrupting the operation of the exposing and developing apparatus.

In order to permit rapid and accurate operation of the photoprinting and processing device there has been provided a series of stops 43a, 43b, 43c shown in plan in FIG. 2 and in more detail in FIGS. 4 through 7.

Referring to FIG. 7 there is shown an exploded view of the stop mechanism in an up-side-down orientation for the purpose of clarity. Each stop 43 consists of a fixed cover plate 47, a spring loaded stop member 48, and small latch 57. The cover plate 47 and stop member 48 are L shaped and adapted to position one corner of a sheet of photosensitive material 50 as shown in FIG. 2. The cover plates 47 are secured to the upper surface 51 of the pressure plate 40 by pins 29 in the manner shown in FIGS. 2 and 3 so that each plate 47 defines the position necessary to locate and orient a different size of photosensitive material beneath the pressure plate 40, 42. Each cover plate 47 is provided with an L shaped recess 52 (best shown in FIG. 7) to freely receive a flange 53 on the stop member 48.

Each stop member 48 extends from the cover plate 47 in the direction of the table 31 through an L shaped slot 54 in the said plate as best shown in FIGS. 4, 5, and 6. The recess 52 in the cover plate 47 and the flange 53 of the stop 48 are bored as indicated at 55 in FIGS. 4–7 to receive the ends of two coils springs 56. The coil springs 56 normally urge the cover plate 47 and stop 48 apart.

Movement of the stop 48 in the direction of the upper surface 21 of the transparent table 31 is selectively controlled by a small latch 57. The latch 57 has an upstanding control slab 58 and a horizontal locking plate 59. The plate 59 is slidably received within a cut out portion 60 provided in the stop 48 just below the flange 53. The locking plate 59 is guided by space pins 61 which depend from the cover plate 47 and extend through spaced elongated openings 62 in the locking plate 59. When the tab 58 is pushed forward into the position shown on the stop assembly 43a in FIGS.. 2 and 4, the spring loaded stop member 48 will be released since the locking plate will be pulled out of the cut out 60. The stop member 48 will then bear against the upper surface 21 of the transparent table 31 to orient any sheet of photosensitive material that may be slid under the pressure plate 40.

When it is desired to use a different size of photosensitive material, the previously used tab is pulled back into the position shown at 43b and 43c in FIGS. 2 and FIGS. 5 and 6 thereby requiring the stop members 48 to clear the surface of the transparent table 31. The desired tab 58 is then pushed forward to position the required sheet of material.

It will be apparent that an operator, even with a minimum of training will soon be able to operate the tabs 58 to orient the photosensitive material within the totally dark exposure chamber 38.

With the photosensitive sheet, which is taken from the storage compartment 32, oriented beneath the pressure plate 40 the second portion of the pressure plate 42 is swung into its closed position overlying the photosensitive material by means of the handle 45. The photoprinting and processing device is now ready for exposure. The operator closes switch 91 next to the platen 39 to operate the lamps 19, 20 which illuminate the indicia on the copy board 18 and expose the photosensitive material.

The exposed sheet 50 is then removed from the platen 39 by raising the pressure plate 42 and fed into the processing developing and fixing tanks 33. The manner in which various photosensitive materials are developed is well-known, forms no part of the present invention, and need not be set forth herein.

In the present invention the processor apparatus for color film and sheets is located above the bellows 27 as indicated at 65. A second processor 66 for developing black and white images is carried on the side of the housing 28 in communication with the interior of the exposure chamber 38. The operator can thus change from size to size and from black and white to color photography without time consuming changes in the camera and developing apparatus.

The material to be copied, in one mode of operation of the present invention is placed upon the copy board 18 in front of the camera lens 25. The copy board is shifted longitudinally of the base by means of a cam and a motor (not shown) responsive to a switch 85 on the control panel 34. The mechanism by which the copy board is moved is shown in U.S. Pat. No.

3,437,409 and need not be repeated here. By shifting the position of the copy board 18 closer or further away from the camera lens 25, the operator can enlarge or reduce the size of the image upon the transparent table 31 as desired. At the same time, the camera lens 25 will be moved in or out with its bellows 27 to keep the material to be copied in focus.

In another mode of operation, the lens board 26 on the bellows 27 is removed together with the lens 25. A slide projector 68, best shown in FIGS. 9–12 is then secured to the end of the bellows 27 by latch means 69 so that its projection lens 70 is directed at the mirror 30. The slide projector 68 is supported by a table 72. Small wheels 73 are provided at the bottom of the table 72 which ride upon two spaced track members 74 on the base. In this manner, the projector 68 is able to be moved back and forth along the base 15 in order to vary the size of the image produced within the camera.

Figure 11:
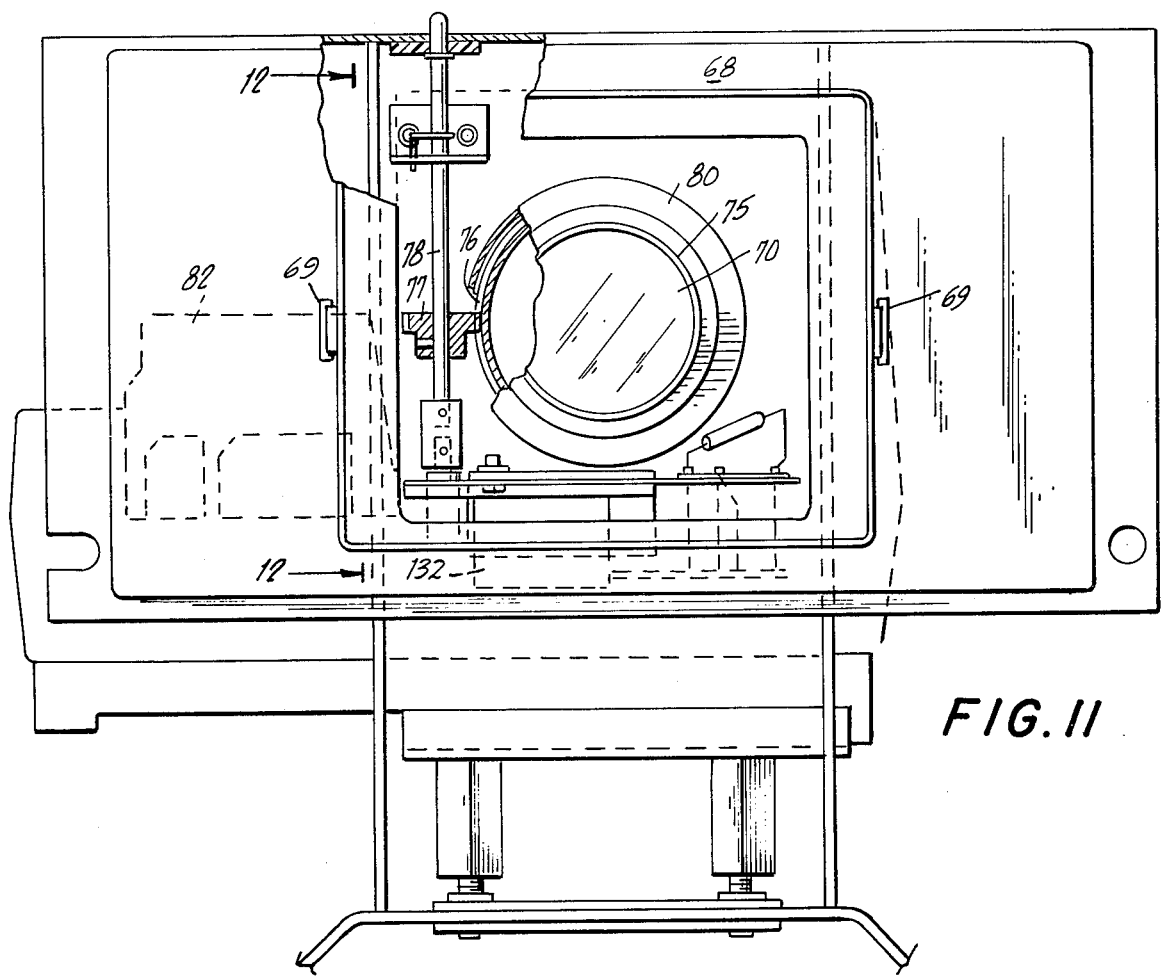
FIG. 11 is a view in front elevation, partly broken away, of the projector.
Figure 12:
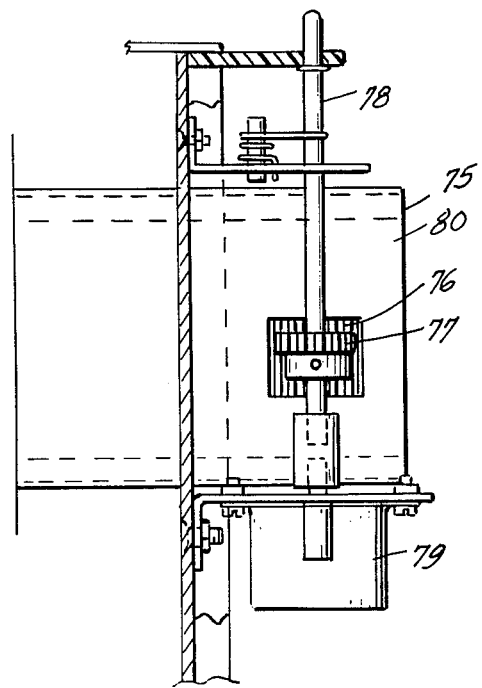
FIG. 12 is a fragmentary view of a portion of the projector lens control shown in FIG. 11.

The projector lens 70 is focused by the mechanism best shown in FIGS. 11 and 12. The lens barrel 75 is formed with a plurality of spaced annular rings 76 around its periphery which are in mesh with the teeth of a spur gear 77. The spur gear 77 is secured to a shaft 78 coupled to a small reversible electric motor 132 carried beneath the lens 70. A sleeve 80 slidably supports the rear portion of the lens barrel 75, which rear portion is not provided with rings 76. As the shaft 78 is rotated by the motor 132, in response to switch 134 on the control panel 34, the lens 70 is moved forward or back to focus the image of the slide 82 within the projector upon the transparent table 31.

From the foregoing, and referring to FIGS. 13 and 14 the operation of the Photoprinting and Processing Device will be understood to be as follows:

With the main power switch 83 turned on, the operator either places the material to be copied on the copy board 18, or substitutes the slide projector 68 for the lens board as previously described. Light from the material to be copied or the slide in the projector is directed into the camera housing where it is reflected upwardly to the transparent table 31. The pressure plate 40 of the platten which is made of translucent material such as frosted plastic or glass is provided with indicia 84 outlining the various image sizes. The copy board 18 or projector is then moved in or out by the operation of switch 85 on the control panel 34 until the desired image size appears on the pressure plate 40. The lenses 25, 70 are also regulated for sharp focus as hereinabove described. The desired stop 43 is selected depending upon the size print to be made and the tab 46 slid to the release position to bring the L shaped stop member 48 to rest upon the transparent table 31.

All lights which may have been used to adjust the image on the transparent table 31 are then extinguished. The camera housing 28 is closed and the interior is in complete darkness.

The operator next opens the paper safe or storage compartment 32 by thrusting his arms through the light excluding panels 37. A sheet of light sensitive material of the type and size desired is withdrawn from the compartment 32 and slipped between the pressure plates 40 and transparent table 31 until its corner is positioned by the stop member 48.

As the compartment 32 is opened a small warning light 86 on the panel 34 is lighted through the operation of normally open microswitch 87 located on the said compartment in contact with the compartment cover 88. The warning light 86 remains on until the cover 88 is closed again so that the operator does not accidentally admit light into the compartment 32 either by directing it through the bellows 27, as in making an exposure, or by opening the top cover 89 of the housing. It will be apparent that light entering the housing 28 while the compartment cover is open will fog the photosensitive material.

With the photosensitive material in place the pressure plate 39 is swung into the position shown in FIG. 1 to hold the said material flat against the transparent table 31 in the focal plane of the camera. The desired exposure time is selected by setting the timer 90 (this setting is normally made before the photosensitive paper is taken from the compartment 32). A small switch 91 adjacent the platen 39 is then tripped. The switch 91 starts the timer and turns on the lamps 19, 20 or the lamp in the slide projector (not shown). At the end of the exposure the timer automatically shuts off the lamps.

Following the exposure, the operator removes the photosensitive material from beneath the pressure plates by swinging the pressure plate 39 back into the position shown in FIG. 3. The pressure plates are thus slightly lifted from the transparent table 31 and the exposed sheet easily slipped out.

The processing step is carried out by feeding the exposed sheet over the top of an inclined guide 92 (see FIG. 9) and into the processor 65.

As the exposed sheet of photosensitive material enters the processor it closes normally opened contacts of microswitches 93 and 93A while opening normally closed contacts of microswitch 93 best shown in FIG. 8 which operate warning light 94 on the panel 34 to prevent the operator from allowing light to enter the exposure chamber 38 until the exposed sheet has completely entered the processing station 65. When the trailing edge of the exposed sheet clears the arms 95 of the microswitches 93, the switches close, the developer motor is engaged and the light 94 stays on until the sheet is in the developer.

Figure 9:
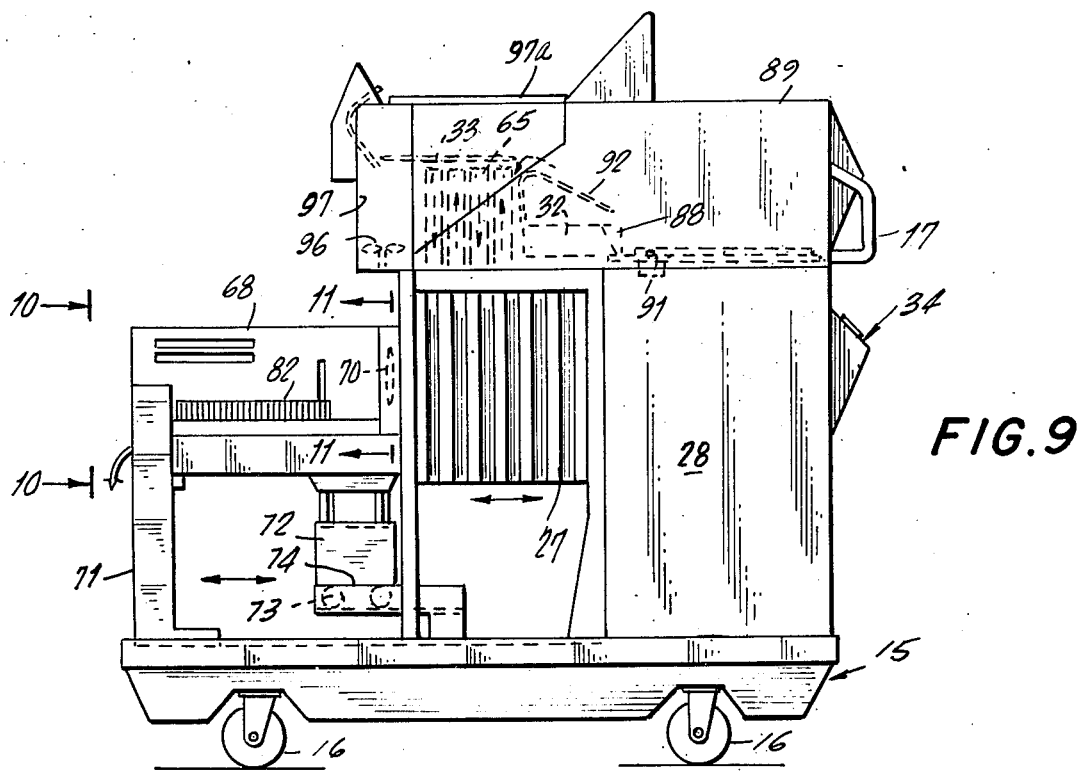
FIG. 9 is a view in side elevation of the embodiment of FIG. 1 showing a slide projector as the object source.
Figure 10:
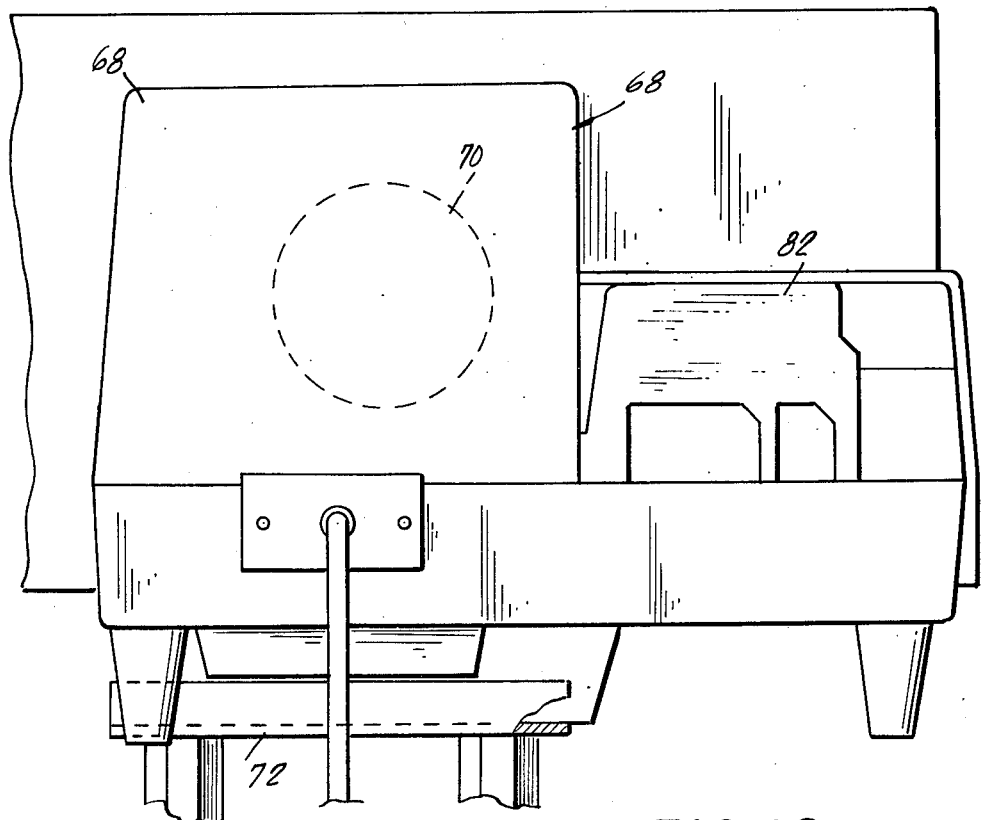
FIG. 10 is a rear view of the projector on an enlarged scale.

The exposed photosensitive sheet 50 is driven through the various tanks indicated in dashed lines in FIG. 9 containing the developing, bleach and fixing solutions in accordance with well-known color or black and white developing art. A flow of drying air is directed over the developed sheet by a fan 96 located in a last chamber 97 from which the finished print is delivered to a table 97a on top of the housing 28.

In the development of color prints the temperature of the developing chemicals is quite critical. For this reason, the control panel 34 is provided with warning lights 98, 99 operated by thermo-sensitive controls located in the developing tanks. The lights 98, 99 light up when the desired temperature has not been reached.

Figure 14:
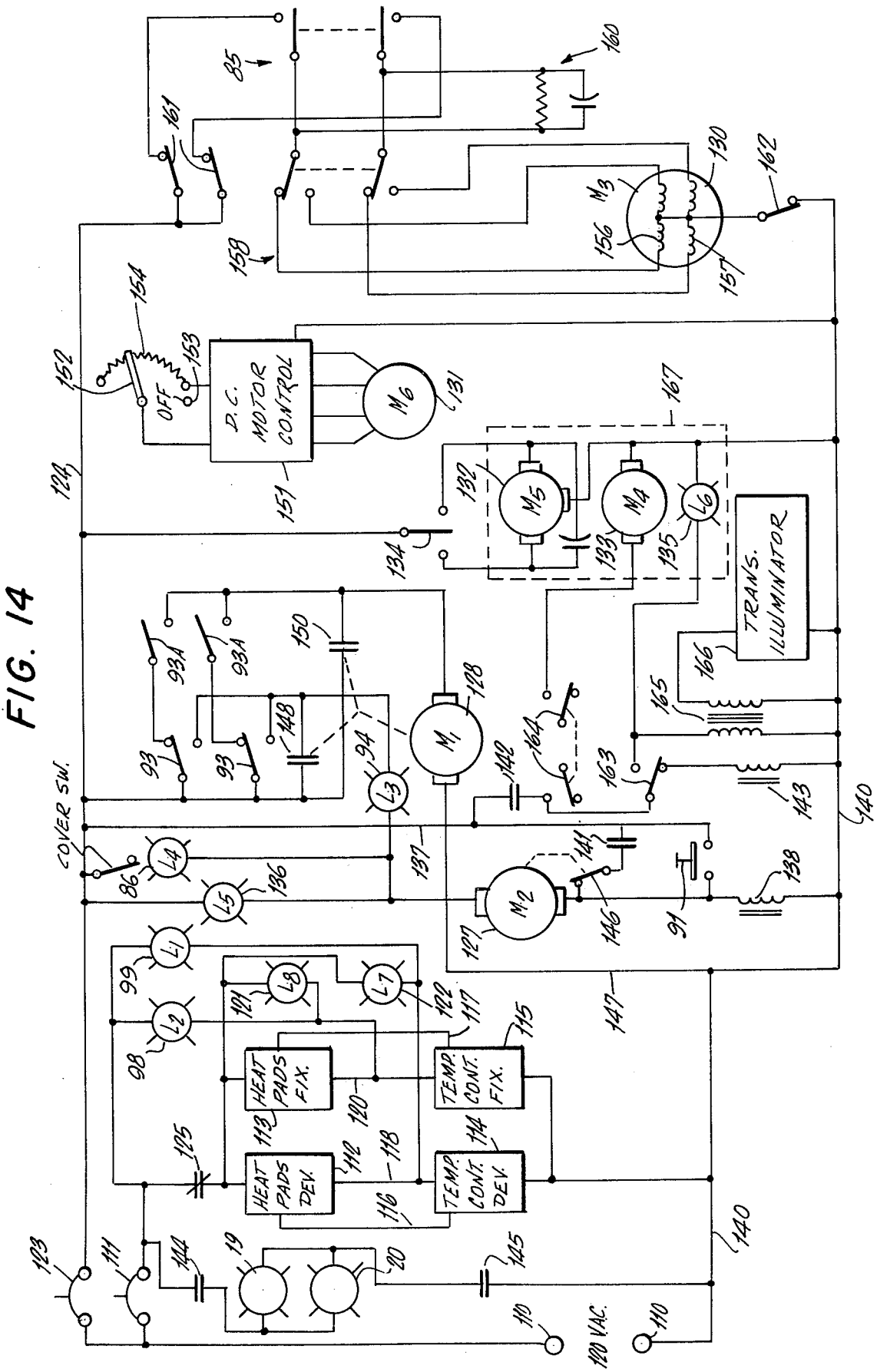
FIG. 14 is a schematic diagram of connections showing the control, lighting, and timing circuits.

Referring now to FIG. 14, the circuit diagram will be described together with the operation with relation to the circuit components. Power (AC, 120V.) is applied to terminals 110, and distributed over two main subcircuits. A first high current branch flows through circuit breaker 111, supplying current to a copy board lamps 19 and 20, and to two heating pads 112 and 113 which heat the developing and fixing solutions to the proper temperature. Pads 112 and 113 are each connected in series with current regulating means 114 and 115, each of these regulators being connected to temperature sensing devices in the solutions by conductors 116 and 117. When the solutions are not at the proper temperature the sensing devices send control currents to the regulators 116 and 117 causing current to flow through conductors 118 and 120, supplying heating current to the pads. Indicator lamps 121 and 122 are lighted, showing that heating voltage is appled to the pads. Indicator lamps 98, 99 are lighted, showing that the developing and fixing solutions are not at the proper temperatures. After a short heating interval, the solutions reach their proper temperature and the heating current is cut off, thereby turning off lamps 98, 99, 121, 122.

A second low current branch flows through circuit breaker 123 and over supply conductor 124 to the control circuitry which focuses the lens, times the exposure, and moves the sensitized paper through the machine and through the developing and fixing solutions. This circuit includes a timer motor 127, which runs a timer 90 to time the exposure; processor motor 131 which moves the paper into the developing mechanism; and a reversible motor 130 which is coupled to both the copy board 18 and the lens system 25 and operates both to either enlarge or reduce the image at the image plane 21. The control circuit also includes a developer motor 128 which operates a warning light and two motors 132 and 133 for operating that section of the device devoted to 35mm transparencies. Motor 132 is a reversible motor and is coupled to the lens system to move it toward or away from the image plane 21 to bring the image into focus. It is controlled by switch 134. Motor 133 is coupled to a fan for cooling the small film transparency and a lamp 135 is used for illuminating the film.

The operation of the circuit is as follows: The circuit is energized initially by closing both circuit breakers 111 and 123. This action provides current through normally closed contacts 125 and lamps 98 and 99 are lighted. Also, lamp 136 is lighted, indicating that circuit breaker 123 is on. Lamps 121 and 122 are lighted at this time because the current through the heat pads 112 and 113 also flows through the parallel path of lamps 121 and 122 and they become incandescent. The operator waits until lamps 98 and 99 are not lighted, indicating that the developing and fixing solutions are at their desired temperatures and the temperature control circuit 114 and 115 have cut off current from both pads. The operator now depresses switch 91, sending current over conductor 137, through the switch 91, and relay winding 138, to common conductor 140 and other power terminal 110.

Current through winding 138 closes contacts 141, to start the timer motor 127, and closes contacts 142 to send current through relay winding 143. This action closes contacts 144 and 145 and opens normally closed contacts 125. Lamps 19 and 20 are turned on to illuminate the copy on board 18 and expose the sensitized paper on glass sheet 31. At the end of the exposure, the timer motor stops and opening switch 146, thereby normalizing relay 138 and opening contacts 144 and 145 to turn off lamps 19 and 20. The exposure operation is not complete.

The operator next removes the exposed paper from the glass 31, guides it into opening 50a (FIG. 8) and thereby operates feelers 95 and 95a to close contacts 93 and 93a and open contacts 93. The trailing edge of the exposed paper releases feeler 95 and closes contacts 93 which applies current to the developer motor 128, the other side of which is connected to conductors 147 and 140. When the developer motor 128 starts, a mechanism closes contacts 148 and 150 as indicated in FIG. 14 by the dashed lines. These contacts remain closed until the motor 128 mechanism opens them. Contacts 148 send current through indicator lamp 94 to show that paper is in the developing system. Contacts 150 are in series with the motor 128.

Motor 131 is controlled by a control circuit 151. This motor is mechanically coupled to the processor 65. The control circuit 151 includes a resistor 154 which can be varied with arm 152. This allows the processor motor 131 to be set at a speed which is optimum for color material.

Motor 130 is coupled to both the copy board 18 and to the lens 25 by a linkage which either enlarges or reduces the image on the image plane. The motor has two sets of reversing windings 156 and 157 which permits the operator to switch it to a slow or fast speed of operation. A slow-fast switch 158 switches from one set of windings to another and a similar set of switches from the enlarge action to the reduce mode. A spark reduction circuit 160 is connected between the two power conductors to reduce sparking at the contact points. Limit switches 161 and 162 are provided for limiting the travel of the copy board and the lens mounting. These limit switches are connected to portions of the moving components in a manner well-known in the art.

There are times when a copy is to be made of a 35 mm transparency. While the copying system is basically the same, a projector type lamp 135 is used and the illumination on the film is much more intense, requiring a cooling fan run by a separate motor 133. The focusing motor 132 is controlled by a two-way switch 134. In order to eliminate the circuit controls used in the regular copy work, a select switch 163 is provided. When this switch is moved to its upper terminal and when switch blades 164 are moved to their upper terminals, relay winding 143 is disconnected, a step-down transformer 165 is connected to the control circuit and the fan motor 133 is started. The low voltage winding sends power to a transparency illuminator 166 which may comprise a single high intensity lamp with reflector and field lens. The indicator lamp 135, when lighted, denotes that the 35 mm system 167 is in operation.

Having thus fully described the invention, what is claimed as new and desired to be secured by Letters Patent is:

1. A combined camera and processing device comprising an elongated base, an indicia carrying section at one end of said base, an exposing section at the other end of the base, a light source for the indicia carrying section, optical means to direct the light coming from the indicia carrying section into the exposing section, a light tight exposing chamber in the exposing section, a window in the said chamber, a transparent plate in said window to receive the light from the indicia carrying section therethrough, a pressure plate overlying the transparent plate, a source of photosensitive material in communication with the interior of the exposing chamber, stop members carried by the pressure plate to orient photosensitive material upon the transparent plate, a control panel at the exposing section end of the camera, and at least one processor for the photosensitive material adjacent to and in communication with the interior of the exposure chamber to receive and process exposed photosensitive material.

2. A device according to claim 1 in which the (exposing) indicia carrying section includes an upstanding copy board longitudinally movable with respect to the base and means responsive to the control panel to vary the position of the said copy board.

3. A device according to claim 1 in which the (exposing) indicia carrying section includes a slide projector movable with respect to the base, a projection lens on the said slide projector, an elongated lens barrel for said lens and means responsive to the control panel to vary the position of the said projector and focus the projection lens.

4. A device according to claim 3 in which the slide projector is provided with wheels, the base is provided with spaced track members to receive the said wheels for movement of the slide projector thereover and the slide projector lens forms part of the optical means for directing light into the exposing section.

5. A device according to claim 3 in which the projection lens focusing means includes a reversible motor, a shaft driven by said motor, a gear carried by the shaft and a plurality of spaced rings on the lens barrel in mesh with the said gear.

6. A device according to claim 1 in which the pressure plate comprises a first and a second plate member hingedly secured together along their adjacent edges, and the stop members extend through the second pressure plate member in the direction of the transparent plate.

7. A device according to claim 6 in which the stop members are L shaped, spaced from each other and off set to locate photosensitive material of different sizes.

8. A device according to claim 7 in which each stop consists of a cover plate, an L shaped stop portion, spring means to urge the stop portion in the direction of the transparent plate and a latch having an upstanding control tab and a horizontal locking plate receivable within a slot in the stop portion.

9. A device according to claim 1 in which the source of photosensitive material is a storage compartment, a light tight cover on the dispensing end of the said compartment, switch means responsive to the movement of the cover and a light on the control panel activated by the switch means when the cover is open.

* * * * *